United States Patent [19]

Lewis et al.

[11] Patent Number: 5,277,387
[45] Date of Patent: Jan. 11, 1994

[54] HOLDING ELEMENT MADE OF PLASTIC

[75] Inventors: Jeffrey C. Lewis, Rochester Hills, Mich.; Daniel G. O'Sullivan, Hornchurch, England

[73] Assignee: TRW United Carr GmbH & Co. KG, Enkenbach-Alsenborn, Fed. Rep. of Germany

[21] Appl. No.: 904,197

[22] Filed: Jun. 25, 1992

[30] Foreign Application Priority Data

Jul. 15, 1991 [DE] Fed. Rep. of Germany ....... 4123430

[51] Int. Cl.⁵ .................................................. F16L 3/08
[52] U.S. Cl. .................................... 248/74.2; 24/482; 24/487; 248/71
[58] Field of Search ............. 248/74.2, 74.3, 74.1, 248/73, 71, 65, 316.5; 24/487, 482, 512, 543

[56] References Cited

U.S. PATENT DOCUMENTS

| 3,163,712 | 12/1964 | Cochran | 248/71 X |
|---|---|---|---|
| 3,429,985 | 2/1969 | Czigler | |
| 3,627,300 | 12/1971 | Caveney et al. | 24/482 X |
| 4,240,604 | 12/1980 | Brach | 248/316.5 |
| 4,291,855 | 9/1981 | Schenkel et al. | |
| 4,623,102 | 11/1986 | Hough, Jr. | 248/68.1 |
| 4,624,432 | 11/1986 | Salacuse | 248/316.5 |
| 4,762,296 | 8/1988 | Kraus et al. | 24/487 X |
| 4,840,334 | 6/1989 | Kikuchi | 248/74.2 X |
| 4,881,705 | 11/1989 | Kraus | 248/74.2 |
| 4,917,340 | 4/1990 | Juemann et al. | 24/543 X |
| 5,020,749 | 6/1991 | Kraus | 248/74.2 X |

FOREIGN PATENT DOCUMENTS 2040348  8/1980  United Kingdom ............... 248/74.2

Primary Examiner—Ramon O. Ramirez
Attorney, Agent, or Firm—Fay, Sharpe, Beall, Fagan, Minnich & McKee

[57] ABSTRACT

A plastic holding element 1 for the mounting of at least one tube or cable 2 includes a connecting base 4 attachable to a support and carrying a mounting area comprising two opposed dish-like elements 5, 6. The dish-like elements are connected to each other at a lower end and are further connected on both sides of the lower region to a resilient intermediate piece, which joins into connecting base 4. The dish-like elements 5, 6 are connectable to each other adjacent their upper end portions via contact elements 16, 17. Elastic strip portions 9, 10 connect the two dish-like elements with each other and are joined thereto at an interior end 13 and exterior ends 11, 12.

10 Claims, 1 Drawing Sheet

HOLDING ELEMENT MADE OF PLASTIC

BACKGROUND OF THE INVENTION

The subject invention relates to a plastic holding element for the mounting of at least one tube or cable and including a connecting base attachable to a support and carrying a mounting area defined by two dish-like elements that are positioned in opposed relationship and are connected to each other at lower end portions. The dish-like elements are further connected on both sides of the lower end portions with a resilient intermediary piece which joins into the connecting base. The dish-like elements have their upper end portions selectively connectable to each other via contact elements.

A holding element of this general type is already known in the state of the art (see German Patent 36 37 738). This known element is designed in such manner that the dish-like elements carry on the inside at least one resilient strip which protrudes freely into the interior of the opened dish elements. The length of these resilient strips which connect with the respective dish-like element on only one side is discretionary. However, assurance must be given that when several tubes are resiliently loaded by these strips, they are properly fastened even under substantial stresses. The drawback in this known construction is that many times there is no precise coordination between the diameter of the tubes which are to be mounted and the length of the plastic strips. Thus, in some application cases, there is no proper and secure placement of the tube or cables which are to be mounted.

The state of the art furthermore includes a tube holder (see German Petty Patent No. 21 62 662) where there is arranged within a two-piece pipe clamp an elastic insert in order to solely mount one single pipe in a manner to be nearly free from vibration. However, this known pipe clamp is not suited for mounting several pipes or cables or pipes or cables of differing diameters.

Another known holding element exhibits, in turn, two dish-like elements that are connected on both sides of the lower region with a resilient intermediary piece (see U.S. Pat. No. 4,240,604). No provision has been made in this case as to how several pipes can be mounted securely between the closed dish elements.

In contract thereto, the present invention has the objective of creating a holding element of the initially mentioned type which is capable in simple construction to properly mount pipes of different diameters or to simultaneously mounting a plurality of pipes.

SUMMARY OF THE INVENTION

According to the invention, the noted objective is achieved by a construction wherein the dish-like elements carry an elastic strip connecting between the two opposed dish-like element areas. The elastic strip is attached at an interior portion and an exterior end. By means of the elastic strip fastened as described, the holding element retains a simple construction and assurance is given that pipes of different diameters can be securely positioned singly or jointly in the holding element and supported free from vibration in a noise-damping fashion. Thus, undesired vibrations are avoided and/or dampened and, moveover, there exists minimal contact between the tube to be fastened and the holding element attached to a support.

In another design version of the invention, two elastic strips connect at an inner end to the lower region connecting the two dish elements. In this arrangement, the two elastic strips may have a common inner end and be fastened via the common end to the region connecting the two dish-like elements with each other.

The two strips may in each case be made of an elastic plastics material and connected by two-component extrusion process or by gluing or by mechanical means to the holding element. Given the simple construction of the entire holding element, favorable results in cost-saving production are achieved.

At least one of the elastic strips may approximately radially traverse one dish-like element and/or intersect the same in sinew-type fashion. With the dish-like elements in closed position, the outer end of the elastic strips, attached at the outer areas of the dish elements, are positioned at a distance from each other, so that tubes with highly diverse diameters are correctly held in the holding element.

In accordance with a further more limited aspect of the invention, the common inner end connecting the two elastic strips with each other is designed more thinly in cross-section than the cross section of one of the elastic strips respectively. In such an arrangement, the two elastic strips may in each case exhibit the identical or nearly identical cross-section.

In order to provide proper guidance when both dish-like elements are closed, there may be provided at the inner surface of each dish-like element a stop shoulder in the area of the outer end of the elastic strip.

According to another aspect of the invention, at least one of the contact elements in the area of the outer end of an elastic strip may include at least one guide shoulder on the inner or outer surface of a dish-like element. Thus, even the outer end of the elastic strips intersecting the respective dish elements in sinew-like fashion are properly held fast.

BRIEF DESCRIPTION OF THE DRAWINGS

In the following description, the invention is described in more detail, by means of execution examples represented in the drawing, wherein.

DETAILED DESCRIPTION OF THE PREFERRED EMBODIMENT

Figure 1:
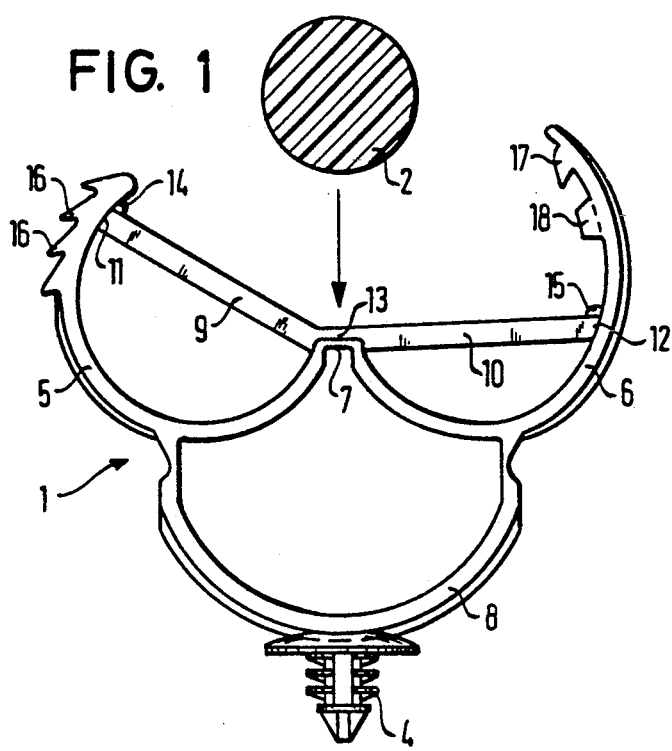
FIG. 1 is a front elevation view showing in opened position the holding element according to the invention.
Figure 2:
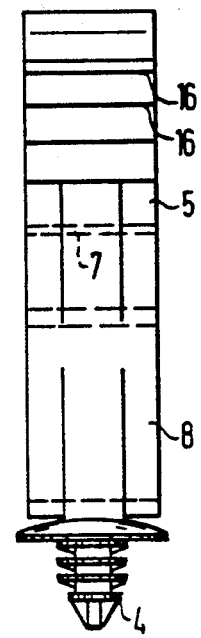
FIG. 2 is a side view of the holding element according to FIG. 1.

Referring to FIGS. 1 and 2 of the drawings, the holding element 1 according to the invention is made of plastics material and its purpose is the secure mounting of at least one pipe or cable 2 from a support frame or panel. To that end, the holding element 1 include a connecting base 4, which can be attached to the associated support frame or panel. Many types of connecting bases could be used, but the subject embodiment shows a conventional fir tree type push-in connector of well known form. Above the base 4 there is located a resilient intermediary support piece 8. A holding area for gripping pipe or cable 2 is located above support piece 8 and is formed by means of two dish-like elements 5, 6.

The dish-like elements 5, 6 are each of semi-cylindrical configuration and are positioned with their concave sides in opposed relationship. The lower end portions of each element 5, 6 are pivotally joined by a thin, flexible web to provide a hinged lower region 7. The ends of the resilient intermediate support piece 8 connect at a spaced distance from lower region 7 as shown. This connection is also a flexible, thin web to provide a hinged arrangement.

At the upper ends, the dish-like elements 5, 6 carry contact connecting components 16, 17 whereby, for example, components 16 are constructed as transverse ribs of saw-tooth form, while element 17 may be designed as a rest hook to allow latching engagement with components 16.

Dish-like elements 5, 6 each carry an elastic strip having portions 9, 10 which are joined to connect the two dish-like element areas with each other. The elastic strip portions 9, 10 are attached to the dish-like elements at an inner end 13 and an outer end 11, 12. The elastic strip portions 9, 10 may somewhat radially traverse the respective dish-like elements 5, 6, whereby, however, the possibility exists that the strip portions 9, 10 could intersect through the respective dish-like elements 5, 6 in sinew-like fashion.

As shown, the elastic strip portions 9, 10 attach to the two dish-like elements 5, 6 at the lower connecting region 7. As is evident from FIG. 1, the two portions 9, 10 of the elastic strip have a common inner end 13 and are attached via same to region 7 that connect the two dish elements 5, 6 with each other.

The two strip portions 9, 10 are each made of elastic plastic material and may, for example, be attached through two component extrusion process at their ends 11, 12, 13 to the inner surface of the respective dish-like element 5, 6. Another attachment possibility is afforded, for instance, through gluing or by mechanical means.

As is evident from FIGURE there may be provided in each instance at the inner surface of each dish-like element 5, 6, a contact shoulder 14, 15 in order to optimally connect the outer ends 11, 12 of the elastic strip portions 9, 10 with dish element 5, 6.

Furthermore, it is obvious from FIG. 1 that in the area of the contact element 17, i.e., the stop nose, there is provided at least one guide shoulder 18. Two guide shoulders 18 and the inner surface of the respective dish element 6 thus form a U-shaped guidance, which is sized to closely receive the width of dish element 5 in mounted position.

According to FIG. 1, a schematically represented cable z is pressed into holding element 1 in the direction of the arrow. As a result, the holding element changes from open position, shown in FIG. 1, to closed position shown in FIG. 3, whereby stop nose 17 engages with the corresponding ribs 16, i.e., the contact elements, thus effecting the closing of the holding element. As can be seen, the two elastic strip portions 9, 10 surround the respective cable 2 to support it away from the elements 5, 6 in a manner that no undesired sound conducted through solids is transferred between the individual elements and that furthermore there exists considerable reduction of vibration. The design in this arrangement is such that with dish-like elements 5, 6 in closed position, the outer ends 11, 12 of the elastic strips 9, 10, attached to the outer areas of the dish elements, are positioned at a distance "a" from each other. This, likewise, results in a beneficial reduction of the sound conducted, as well as a reduction of vibration and dampening of undesired vibrations, since the two outer ends 11, 12 of the elastic strip portions do not touch each other. In closed position of the two dish-like elements 5, 6, the guide shoulder 18, moreover, effects correct fixation of the two dish elements vis-a-vis each other, so that no undesired displacement can occur.

Holding element 1 is shown attached via connecting base 4 in an opening of a support, whereby the design of the connecting base 4 may take other forms, for instance in the form of a profile bolt.

Figure 4:
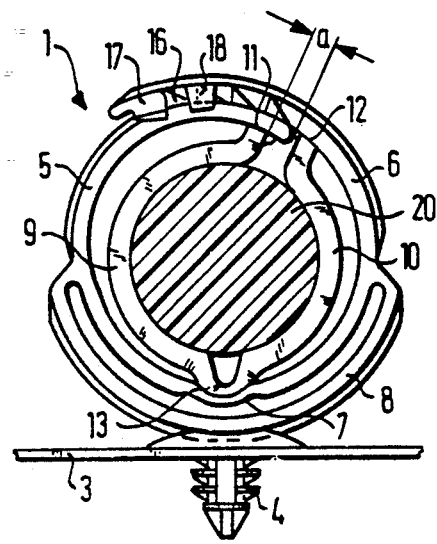

If, according to FIG. 4, a cable of larger diameter is to be fastened, it is evident that here, as well, the two elastic strip portions 9, 10 surround cable 20, and that merely in the area of the inner end 17 and the outer end 11, 12, positioned at a distance "a' from one another, there is a connection to the dish elements 6, 7 and the intermediary piece 8, serving as a filter. Again, the two dish-like elements 5, 6 are properly fixed against each other via guide shoulders 18.

Figure 3:
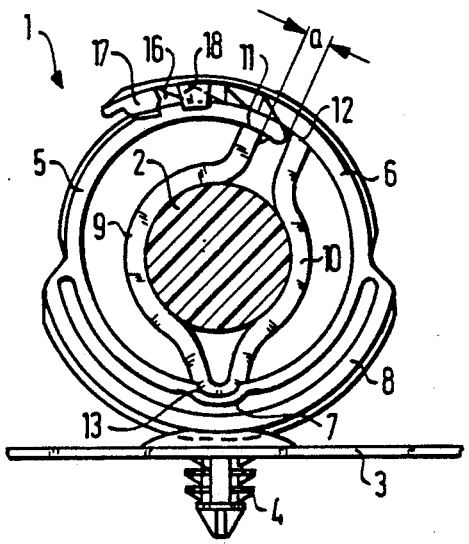
FIG. 3 is a front elevational view showing the holding element in its mounted position fastening one tube; and, FIG. 4 is a front elevational view showing the holding element in mounted position fastening one larger diameter tube.

Instead of the mounting of two cables, 2 or 20, of different diameters, according to FIGS. 3 and 4, there also exists the possibility (not shown) of mounting several tubes or cables properly between the elastic strip portions 9, 10, which, in turn are attached via the inner end 13 and via the outer ends 11 and 12 to dish elements 5, 6.

As a result of the particular design of the holding element, which is made of plastics material, in combination with the elastic strip portions 9, 10, connected at both ends 11, 12, 13 with the inner surface of the respective dish element 5, 6, there is attained with simple construction of the entire unit, excellent damping of vibrations, despite mounting of tube or cable of different diameter, whereby mounting or dismounting process is rapidly achievable.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. In a holding element formed of plastics material for mounting of at least one tube or cable and comprising a connecting base means attachable to a support and carrying a tube or cable holding area defined by a pair of dish-shaped elements mounted in opposed facing relationship, the dish-shaped elements each having lower end portions pivotally joined with each other and upper end portions selectively engageable with each other, the improvement wherein elastic strip means connect between the dish-like elements with end portions of the strip means joined to the dish-like elements at locations such that the elastic strip means resiliently encircles tubes or cables placed in the holding area and the upper end portions are selectively engaged, the strip means comprising two elastic strip portions with each strip portion having first and second ends and connected across a separate respective one of the dish-shaped elements with the first end of each strip portion connected adjacent the upper end portion of its respective dish-shaped element and its second end connected adjacent the lower end portion of its respective dish-shaped element.

2. A holding element according to claim 1 including at least one guide shoulder on at least one of the dish-like elements.

3. A holding element according to claim 1 wherein the two elastic strip portions have their second ends joined and are attached at their second ends to the connection connecting the lower end portions of the two dish-like elements.

4. A holding element according to claim 1 wherein the elastic strip means is made of a plastics material.

5. A holding element according to claim 1 wherein the elastic strip means approximately radially traverses the dish-like elements.

6. A holding element according to claim 1 wherein a stop shoulder is provided on a dish-like element in the area of the outer end portion to limit movement of the dish-like elements.

7. A holding element according to claim 1 wherein the two elastic strip portions of the elastic strip means have their first ends attached to the upper end portions of the dish elements and shoulders are formed on the dish-like elements to prevent the first ends of the elastic strip portions from touching each other when the upper end portions of the dish-like are selectively engaged.

8. A holding element according to claim 6 wherein the common inner end connecting the two elastic strip portions with each other is thinner in cross-section than the cross section of each of the elastic strip.

9. A holding element according to claim 6 wherein the two elastic strip portions have substantially the same cross-section.

10. In a holding element formed of plastics material for mounting of at least one tube or cable and comprising a connecting base means attachable to a support and carrying a tube or cable holding area defined by a pair of dish-shaped elements each having lower end portions pivotally joined with each other and upper end portions selectively engageable with each other, the improvement wherein elastic strip means connect between the dish-like elements with end portions of the strip means joined to the dish-like elements at locations such that the elastic strip means resiliently encircles tubes or cables placed in the holding area and the upper end portions are selectively engaged, and wherein the elastic strip means comprises two elastic strip portions each connected at an inner end to a lower end portion of a dish-shaped element, the two elastic strip portions having a common inner end and being attached via the common inner end to the connection connecting the lower end portions of the two dish-like elements.

* * * * *